2,920,998
VIOMYCIN

Francis A. Hochstein, Garden City, and Robert L. Miller, Brooklyn, N.Y., assignors to Chas. Pfizer & Co., Inc., New York, N.Y., a corporation of Delaware No Drawing. Application January 28, 1957
Serial No. 636,494

7 Claims. (Cl. 167—65)

This invention relates particularly to a novel method for the purification of the antibiotic, viomycin. It also especially concerns the preparation of methyl viomycin and new therapeutic compositions containing the same.

Viomycin appears to be a polypeptide antibiotic and is particularly used in tuberculosis therapy. It is a polyacidic strong base of the apparent empirical formula $$(C_{17}\text{—}18H_{31}\text{—}3N_9O_{7\text{—}8})x$$

The free base has not been prepared, though several crystalline salts are known. These include the sulfate, hydrohalides, reineckate, oxalate, sulfate-picrate and picrate. A crystalline $\beta$-naphthalenesulfonate salt has also been prepared. This salt does not appear to be quite analogous to the other simple salts and may be a mixed sulfate-$\beta$-naphthalenesulfonate.

In the commercial production of viomycin substandard lots are sometimes obtained, despite every precaution, and these have heretofore resisted purification by all known methods. These lots are characterized by their low bioassay, normal ultraviolet and chemical assay, and their failure to crystallize from water-methanol solutions. Attempts to purify these crude preparations by crystallization from water, by precipitation from water with methyl cellosolve, by chromatography on silica gel, cotton succinate and on Florisil, by resin absorption, and by precipitation with Orange II dye, with ultrawet E, $\beta$-naphthalene-sulfonic acid, polar yellow, or picric acid showed no useful concentration of viomycin in any case.

A reversible reaction now has been found to occur between viomycin and methanol, whereby such substandard viomycin can be excellently and cheaply purified and recovered. The compound formed in this reaction, methyl viomycin, is also of great value in itself as a therapeutic agent. It is similar to viomycin in its solubility, ultraviolet and infrared absorption spectra, and in its antibacterial spectrum. It can be unequivocally differentiated from viomycin by the following characteristics: (a) It contains about 3.5% methoxyl, which cannot be removed by digestion in acetone. Viomycin frequently holds large amounts of methanol of crystallization but this is readily removed by thorough washing with acetone. (b) It has higher $R_F$ value on paper chromatograms utilizing butanol-toluenesulfonic acid-piperidine and propanol-water-acetic acid systems as solvents. (c) The bioassay on K. pneumoniae is low, 350 $\gamma$/mg. vs. 830 $\gamma$/mg. for pure anhydrous viomycin sulfate. (d) Th chemical assay (streptidine test) shows a higher assay than does viomycin, about 1100 $\gamma$/mg. vs. 830 $\gamma$/mg. for the respective sulfates. (e) It shows a greater optical rotation (—40 to —45°) than does viomycin (—30 to —35°).

Methyl viomycin is best prepared and the purification method of this invention best effected by prolonged (4–72 hours) heating of a crude viomycin salt in methanol solution. Those salts should be employed, of course, which are appreciably soluble in the methanol solvent. Thus, viomycin sulfate can not readily be employed in a practicable operation, but the viomycin hydrohalides are preferred e.g. the hydrochloride, hydrobromide and hydroiodide. In general, the crude salt should have a solubility in the system of at least about 0.05% by weight. The rate of reaction can be appreciably increased by the addition of formaldehyde (1% to 25% of the weight of the viomycin), although this does not appear to influence the final outcome of the digestion.

Simple solution of the methyl viomycin salt in water then regenerates the crystalline purified, viomycin salt. Although regeneration may be slow at room temperature, it is substantially complete within one to two hours at about 80–100° C. Methyl viomycin salts appear to form mixed crystals with viomycin salts and crystalline products have been obtained containing from 0.1 to 3.6% methoxyl. The 3.6% appears to represent a practical upper limit of methoxyl content.

Although methyl viomycin salts show a lower activity against K. pneumoniae than do viomycin salts, they have a higher activity against M. berolinese, which makes them unexpectedly valuable for many therapeutic uses, as compared to viomycin salts. No differences in activity could be demonstrated against several strains of Mycobacterium tuberculosis.

TABLE I
COMPARISON OF VIOMYCIN AND METHYL VIOMYCIN

| Organism | | Viomycin. HCl | Methyl Viomycin. HCl |
|---|---|---|---|
| K. pneumoniae | $\gamma$/mg | 935 | 570 |
| Mycobacterium Tuberculosis; | | | |
| H37 Rv | m.i.c. | 0.31–0.62 | 0.31 |
| CDC 9181 | | 0.31 | 1.2 |
| Rav., bovine | | 0.31 | 0.31 |
| I.N.H. resistant | | 0.62 | 0.31 |
| Streptomycin resistant | | 0.31 | 0.31 |
| Copenhagen Saprophyte | | >0.62 | >0.62 |

The acute toxicity of methyl viomycin has been studied in mice. It does not differ appreciably from viomycin itself. These data are reported in Table II for intravenous toxicity.

TABLE II
INTRAVENOUS TOXICITY IN MICE

| Substance | Bioassay, $\gamma$/mg. | $LD_{50}$, mg./kg. |
|---|---|---|
| Viomycin hydrochloride | 870 | 218 |
| Methylviomycin hydrochloride | 600 | 200 |

Peculiarly enough, it has been found that methanol is highly specific in the digestion step. Neither ethanol, propanol nor isopropanol has yielded an analogous viomycin derivative nor substantially aided in purification of the crude antibiotic. Furthermore, the methanol employed should not be "wet" but should be either anhydrous or containing no more than about 10% water. A preferred and especially successful purification procedure according to this invention involves (a) conversion of the crude viomycin sulfates by known methods to the hydrochloride, (b) digestion of the hydrochloride under reflux in 95% methanol, which dissolves impurities and converts the viomycin to crystalline methyl viomycin hydrochloride, (c) heating the methyl viomycin for about ½ to 3 hours in aqueous solution to regenerate viomycin and (d) conversion of the viomycin hydrochloride to the sulfate by known methods. This process consistently yields crystalline viomycin sulfate assaying 700 $\gamma$/mg. from crudes of half that potency. The yields are furthermore excellent (60%–75%).

The rate of conversion of the methyl viomycin salt to the corresponding viomycin salt is influenced both by temperature and by acidity. In order to determine the effect of acidity on rate of conversion, solutions were prepared containing 10 mg. of methyl viomycin (original bioassay, 510 γ/mg.) per ml. of 0.05 M phosphate buffer at various pH's. These were heated to 80° C. in a constant temperature bath and aliquot portions were withdrawn at intervals for bioassay. It was concluded that the optimum pH appears to be on the acid side, preferably the range pH 3–5. At pH 7 or higher, the rate of decomposition of viomycin is excessively high, so that a high potency product cannot be obtained.

The effect of temperature on regeneration time, at pH 4, for a sample of methyl viomycin of original assay 585 γ/mg. is shown in Table III.

TABLE III

| Temperature: | Time |
| --- | --- |
| 25° | 7 days |
| 50° | 20 hours |
| 60° | 10 hours |
| 80° | 2 hours |
| 100° | 50 minutes |

As aforesaid, therapeutic compositions containing the various methyl viomycin salts, which are obtained as intermediate products in the course of this new purification procedure, are themselves of value in tuberculosis and other types of therapy. These new compositions comprise the desired methyl viomycin salt, e.g. a hydrohalide, and a pharmaceutically acceptable, intramuscularly injectable carrier. The compositions may take the form of solids suitable for the extemporaneous preparation of an injectable solution or suspension. Alternatively, the methyl viomycin salt may be incorporated in an injectable liquid menstruum, such as a sterile aqueous vehicle, propylene glycol, etc. Any of the materials used in pharmaceutical practice may generally be employed. Preferred dosages are substantially the same as for the corresponding viomycin salt.

The following examples are given simply to illustrate this invention and not in any way to limit its scope, which is defined in the appended claims.

*Example I*

Amorphous viomycin hydrochloride (bioassay 870 γ/mg., methoxyl 0.0%), 0.20 g. was suspended in 400 ml. of anhydrous methanol and heated under reflux for 72 hours, at which time it was all in solution. The solution was concentrated to 50 ml. and placed in the refrigerator overnight. The crystalline precipitate (about 0.15 g.) was filtered, washed with acetone, stirred in 30 ml. acetone for one hour, filtered and dried in vacuo at 80° C. for one hour. Bioassay 295 γ/mg. (Kp. Turb). Chem. assay, 900 γ/mg. N, 21.8%; methoxyl, 3.57%; λ max=268 mμ, $$E^{1\%}_{1\,cm.}=332$$

Methyl viomycin has a solubility in methanol of about 0.2–0.4 g./100 ml., much greater than that of viomycin hydrochloride.

No further change in bioassay or methoxyl content was effected by an additional 48 hours' heating in methanol. The *K. pneumoniae* activity was completely regenerated on heating to 100° C. for 1½ hours in aqueous solution, at pH 4–5, and purified, crystalline viomycin hydrochloride was recovered from the solution.

When smaller volumes of methanol are used, e.g. 20 to 50 ml. per gram of amorphous viomycin hydrochloride, the homogeneous crystalline product formed within 6–24 hours has a higher *K. pneumoniae* activity and a lower methoxyl content than the product just described. It appears to consist of mixed crystals of viomycin and methyl viomycin hydrochlorides. Such mixtures commonly have a *K. pneumoniae* bioassay of 500–600 γ/mg. and contain 1.5–2.5% methoxyl.

No significant difference was observed in the product when 95% methanol (5% water) was used in place of the anhydrous solvent, though the rate of crystallization appeared to be substantially greater in the aqueous methanol. Attempts to form ethyl, propyl and ispropyl viomycin by similar procedures failed completely.

*Example II*

Two grams of amorphous viomycin hydrochloride were heated under reflux in 200 ml. of anhydrous methanol for 12 hours. The crystalline product was separated by filtration, digested in acetone for 3 hours, filtered and dried in vacuo at 80° C. This material was compared to two products prepared in similar manner except that one had 0.02 g. added formaldehyde (as formalin), the second 0.20 g. added formaldehyde. The two formaldehyde-treated samples were heated for only six hours each, at which time they were completely crystalline. The properties of the various products (1.14 g. crystals recovered in each case) are shown in the following table:

| | $CH_2O$, percent | MeO, percent | Bioassay Kp., γ/mg. | Chem. Assay, γ/mg. | $E^{1\%}_{1\,cm.}$ at 268 mμ |
|---|---|---|---|---|---|
| Amorphous Viomycin HCl | ------- | 0.28 | 665 | 700 | ------- |
| Viomycin | 0.0 | 1.68 | 500 | ------- | 308 |
| Viomycin 0.01 pt. $CH_2O$ | .04 | 2.13 | 445 | 1,130 | 316 |
| Viomycin 0.1 pt. $CH_2O$ | .05 | 3.06 | 350 | ------- | 325 |

When formaldehyde or acetaldehyde were added to suspensions of amorphous viomycin hydrochloride in ethanol (absolute or 90%) no crystals were formed even after 48 hours at reflux temperature.

*Example III*

Crude viomycin sulfate from a plant operation was used, containing 3% ash, bioassay (Kp.) 415 γ/mg.

Two successful procedures were used, and are described hereafter under A and B. Procedure B is perhaps the more commercially practical.

A. Barium chloride (25% aqueous solution) was added to a 10% solution of the crude viomycin sulfate until only a trace of sulfate ion was present. The resulting slurry was filtered through Supercel, the precipitate washed, and the combined filtrate and wash concentrated in vacuo to 15% solids. Six hundred ml. of this aqueous concentrate were run into 12 liters of dry acetone with stirring and the fine granular precipitate of viomycin hydrochloride dried for 2 hours at 70° C. in a vacuum oven. Bioassay, 410 γ/mg., chem. assay 500 γ/mg.

Five grams of this product were suspended in 500 ml. of anhydrous methanol, and heated under reflux for 16 hours. The crystalline, insoluble product was filtered from the hot solution, washed with methanol and dried briefly in air. Wt. 2.5 g. Bioassay, 400 γ/mg. This product was dissolved in 25 ml. water and heated to 80° C. for 90 minutes. Triethylamine sulfate (2.5 g.) was added, and then methanol, to precipitate amorphous viomycin sulfate. This product was recrystallized from water-methanol (with some difficulty) to yield 1.9 g. viomycin sulfate, bioassay, 710 γ/mg. ash, 0.6%. Yield 65%.

B. Crude viomycin hydrochloride prepared as in procedure A was concentrated to 33% solids and a solution containing 15 g. of the crude viomycin hydrochloride (6.05 million units) in 30 ml. water was added slowly with vigorous stirring to 600 ml. of methanol. The suspension was seeded with crystalline methyl viomycin hydrochloride and heated under reflux for 6 hours. At this time over 80% of the suspended solid appeared to be crystalline when examined under the polarizing microscope.

The suspension was filtered while hot, washed with methanol and dried at 70° C. in a vacuum oven. The solid product, 6.6 g., was dissolved in 60 ml. water and adjusted to pH 4 with acetic acid. A carbon absorbent (Darco G–60), 0.6 g., was added and the solution heated to 80° C. for 2¼ hours, at which time the bioassay of the dissolved viomycin had risen from 450 γ/mg. to 750 γ/mg.

The solution was filtered to remove charcoal and 7 ml. of 40% methanolic triethylamine sulfate was added. Viomycin sulfate was crystallized (following heavy seeding, and some initial oiling out), by the addition of 200 ml. of methanol in 4 hours. The crystalline product was filtered and washed with acetone. The damp product was crushed in a mortar, stirred with 50 ml. acetone for 10 minutes, filtered and dried at 80° C. in vacuo for 1 hour. Wt., 5.92 g. Bioassay, 750 γ/mg. Yield, 73% (77% after correction for assay samples).

*Example IV*

The procedure described in the firsst two paragraphs of Example I was repeated twice, once using crude viomycin hydrobromide and once using crude viomycin hydroiodide in lieu of the hydrochloride. In each instance the corresponding methyl viomycin hydrohalide was first obtained, and the purified, crystalline viomycin hydrohalide then regenerated therefrom.

What is claimed is:

1. A process for obtaining a purified, crystalline viomycin salt which comprises digesting a crude viomycin salt having a solubility in 90-100% methanol of at least about 0.05% by weight, in methanol solution containing from 0 to 10% water at an elevated temperature for at least about 4 hours, recovering the crystalline precipitate thereby produced, heating said product in aqueous solution at an acidic pH, and recovering the crystalline viomycin salt thereby obtained.

2. The process of claim 1 wherein the viomycin salt is viomcyin hydrochloride.

3. The process of claim 1 wherein the viomycin salt is viomycin hydrobromide.

4. The process of claim 1 wherein the viomycin salt is viomycin hydroiodide.

5. The process of claim 1 wherein the methanol solution contains between about 1% and 25% of formaldehyde, by weight of the viomycin salt.

6. A process for obtaining purified, crystalline viomycin sulfate which comprises digesting crude viomycin hydrochloride in methanol solution containing from 0 to 10% water at an elevated temperature for at least about 4 hours, recovering the crystalline precipitate thereby produced, heating said product in aqueous solution at an acidic pH, contacting the aqueous solution with methanol in the presence of triethylamine sulfate, and recovering the crystalline viomycin sulfate thereby obtained.

7. A process for obtaining purified, crystalline viomycin hydrochloride which comprises heating a solution of crude viomycin hydrochloride in methanol containing from 0 to 10% water, under reflux for from about 4 to 72 hours, cooling and concentrating the solution, recovering the crystalline precipitate thereby produced, heating said product in aqueous solution for from about ½ to 3 hours at a pH substantially between 3 and 5 and a temperature substantially between 80° and 100° C., cooling the solution, adding methanol thereto, and recovering the crystalline viomycin hydrochloride thereby precipitated.

References Cited in the file of this patent

UNITED STATES PATENTS 2,633,445   Marsh et al. _____ Mar. 31, 1953

FOREIGN PATENTS 297,613   Switzerland _____ Mar. 31, 1956

OTHER REFERENCES

Karrer: Organic Chem., 1946, 2nd ed., p. 84.